(12) United States Patent
Ishii

(10) Patent No.: US 6,669,344 B2
(45) Date of Patent: Dec. 30, 2003

(54) COLOR SYNTHESIZING OPTICAL APPARATUS AND PROJECTION TYPE DISPLAY APPARATUS

(75) Inventor: Koichiro Ishii, Zushi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/200,507

(22) Filed: Jul. 23, 2002

(65) Prior Publication Data

US 2003/0025879 A1 Feb. 6, 2003

(30) Foreign Application Priority Data

Jul. 25, 2001 (JP) ........................................ 2001-224668

(51) Int. Cl.$^7$ ............................................. G03B 21/14
(52) U.S. Cl. ......................................................... 353/20
(58) Field of Search ................................ 353/20, 31, 33, 353/34, 37, 38, 98, 99; 349/5, 8, 9

(56) References Cited

U.S. PATENT DOCUMENTS

| | | | |
|---|---|---|---|
| 5,327,270 A | | 7/1994 | Miyatake .................... 359/63 |
| 5,374,968 A | * | 12/1994 | Haven et al. ................ 353/31 |
| 5,798,819 A | * | 8/1998 | Hattori et al. .............. 353/33 |
| 5,826,959 A | * | 10/1998 | Atsuchi ........................ 353/20 |
| 6,010,221 A | * | 1/2000 | Maki et al. .................... 353/33 |
| 6,174,060 B1 | * | 1/2001 | Imaoka et al. ............... 353/31 |
| 6,183,090 B1 | * | 2/2001 | Nakanishi et al. ........... 353/20 |
| 6,343,864 B1 | * | 2/2002 | Tajiri ........................... 353/20 |
| 6,394,606 B1 | * | 5/2002 | Miyawaki et al. ........... 353/20 |
| 6,429,906 B1 | * | 8/2002 | Sekine et al. ................. 349/9 |

FOREIGN PATENT DOCUMENTS

JP 2599309 1/1997

* cited by examiner

Primary Examiner—William Dowling
(74) Attorney, Agent, or Firm—Miles & Stockbridge P.C.

(57) ABSTRACT

A color synthesizing optical apparatus comprises a plurality of reflection type light valves, a color synthesizing/analyzing optical system, and quarter wave plates disposed corresponding to the plurality of light valves. In a state to effect image-displaying, in one of first and second light valve groups, phase advance axes of the quarter wave plates are disposed substantially in parallel to predetermined axes within surfaces of the light valves which axes correspond to the respective predetermined axes within the projection image field plane of the light valves. In the other group in the same state, phase advance axes of the quarter wave plates are disposed substantially perpendicularly to the predetermined axes within the surfaces of the light valves which axes correspond to the respective predetermined axes within the projection image field plane of the light valves.

3 Claims, 4 Drawing Sheets

COLOR SYNTHESIZING OPTICAL APPARATUS AND PROJECTION TYPE DISPLAY APPARATUS

This application claims the benefit of Japanese Patent application No. 2001-224668 which is hereby incorporated by reference.

BACKGROUND OF THE INVENTION

1. Field of the Invention

The present invention relates generally to a color synthesizing optical apparatus and a projection type display apparatus, and more particularly to a projection type display apparatus for color-synthesizing a plurality of colors and projecting a full-color image on a screen through a projection lens.

2. Related Background Art

An apparatus disclosed in, for instance, Japanese Patent No. 2599309 is known as a projection type display apparatus constructed to color-synthesize a plurality of colors and to project a full-color image on a screen through a projection lens. In this apparatus, a light source beam emitted from a light source is color-separated into a blue (B) light beam, a green (G) light beam and a red (R) light beam assuming three primary colors by a color separating optical system. The thus color-separated light beams enter polarization beam splitters disposed for the respective colors. Then, the respective S-polarized light beams among the incident light beams are reflected by the polarization separation surfaces of the respective polarization beam splitters and travel toward the respective reflection type light valves disposed for the respective color beams. Each reflection type light valve modulates the incident light beam in accordance with an image signal and lets the modulated light beam exit. The light beams having exited the respective reflection type light valves enter again the respective polarization beam splitters. The polarization separating surfaces of the respective polarization beam splitters transmit only the respective modulated light beams, thereby analyzing the respective color light beams. The thus analyzed color light beams enter a color synthesizing optical system constructed of a cross dichroic prism from surfaces different corresponding to the respective colors. Then, the color synthesizing optical system color-synthesizes the analyzed color light beams and lets these light beams exit toward the projection lens. The projection lens projects on the screen a full-color light image of images generated on the reflection type light valves.

Further, U.S. Pat. No. 5,327,270 (Japanese Patent Post-Exam Publication No.7-38050) discloses an architecture for improving a contrast of the projected image on the projection type display apparatus having the construction described above. This architecture is that, for each color, a quarter wave plate is disposed in a light path between the polarization beam splitter serving as a polarizer and an analyzer and the reflection type light valve. Then, the quarter wave plate is disposed so that a phase advance axis (fast axis) or a phase delay axis (slow axis) of the quarter wave plate is orthogonal to a plane containing an incident optical axis and a reflection optical axis of the polarization beam splitter.

The projection type display apparatus in the prior art, however, has a problem in which ununiformity in color occurs at four corners of the projected image projected on the screen. The occurrence of the ununiformity in color is conspicuous especially when the projected color light beam assumes a half tone.

SUMMARY OF THE INVENTION

It is a primary object of the present invention, which was devised to obviate the above problem, to provide a color synthesizing optical apparatus and a projection type display apparatus that are capable of reducing ununiformity in color of a projected image.

To accomplish the above object, according to the first invention, a color synthesizing optical apparatus comprises:

a plurality of reflection type light valves modulating incident light beams on the basis of image signals and letting the modulated beams exit;

a color synthesizing/analyzing optical system including polarization beam splitters corresponding to the plurality of reflection type light valves, and color-synthesizing and analyzing the light beams having exited the plurality of reflection type light valves; and quarter wave plates disposed corresponding to the plurality of reflection type light valves in light paths extending from exit surfaces of the reflection type light valves to incident surfaces of the polarization beam splitters;

wherein a first light valve group is constructed of the reflection type light valve(s) that lets (let) the beam(s) exit, which makes (make) none of reflection or is (are) reflected an even number of times in the light paths till the light beams exit the color synthesizing/analyzing optical system since the light beam(s) exited the reflection type light valve(s), a second light valve group is constructed of the reflection light valve(s) that lets (let) the beam(s) exit, which is (are) reflected an odd number of times in the light paths till the light beams exit the color synthesizing/analyzing optical system since the light beam(s) exited the reflection type light valve(s);

in a state where the first light valve group and the second light valve group are being energized to effect image-displaying, in one group of the first light valve group and the second light valve group, phase advance axis (axes) of the quarter wave plate(s) is (are) disposed substantially in parallel to predetermined axis (axes) within surface(s) of the reflection type light valve(s) which axis (axes) correspond to the predetermined axis (axes) within the projection image field planes of said light valve(s); and in the other group of the first light valve group and the second light valve group in the same state, phase advance axis (axes) of the quarter wave plates is (are) disposed substantially perpendicularly to the predetermined axis (axes) within the surface(s) of the reflection type light valve(s) which axis (axes) correspond to the predetermined axis (axes) within the projection image field plane(s) of said light valve(s).

In the color synthesizing optical apparatus according to the first invention, the beams of light polarization-separated and color-separated in a polarization separating/color separating optical system enter the plurality of reflection type light valves.

According to the second invention, a projection type display apparatus comprises:

a light source supplying light beams;

a polarization separating/color separating optical system effecting polarization separation and color separation with respect to a light beam emitted from the light source;

a plurality of reflection type light valves modulating incident light beams on the basis of image signals and letting the modulated light beams exit;

a color synthesizing/analyzing optical system including polarization beam splitters corresponding to the plurality of reflection type light valves, and color-synthesizing and analyzing the light beams having exited the plurality of reflection type light valves;

quarter wave plates disposed corresponding to the plurality of reflection type light valves in light paths extending from exit surfaces of the reflection type light valves to incident surfaces of the polarization beam splitters; and a projection optical system projecting images generated on the plurality of reflection type light valves, wherein a first light valve group is constructed of the reflection type light valve(s) that lets (let) the light beam(s) exit, which makes (make) none of reflection or is (are) reflected an even number of times in the light paths till the light beams exit the color synthesizing/analyzing optical system since the light beam(s) exited the reflection type light valve(s);

a second light valve group is constructed of the reflection light valve(s) that lets (let) the light beam(s) exit, which is (are) reflected an odd number of times in the light paths till the light beams exit the color synthesizing/analyzing optical system since the light beams exited the reflection type light valves;

in a state where the first light valve group and the second light valve group are being energized to effect image-displaying, with respect to one of said first light valve group and said second light valve group, phase advance axis (axes) of the quarter wave plate(s) is (are) disposed substantially in parallel to predetermined axis (axes) within surface (s) of the reflection type light valve(s) which axis (axes) correspond to the predetermined axis (axes) within the projection image field plane(s) of said light valve(s); and with respect to the other group of the first light valve group and the second light valve group in the same state, phase advance axis (axes) of the quarter wave plate(s) is (are) disposed substantially perpendicularly to the predetermined axis (axes) within the surface(s) of the reflection type light valve(s) which axis (axes) correspond to the predetermined axis (axes) within the projection image field plane(s) of said light valve(s).

DESCRIPTION OF THE PREFERRED EMBODIMENTS

Figure 1:
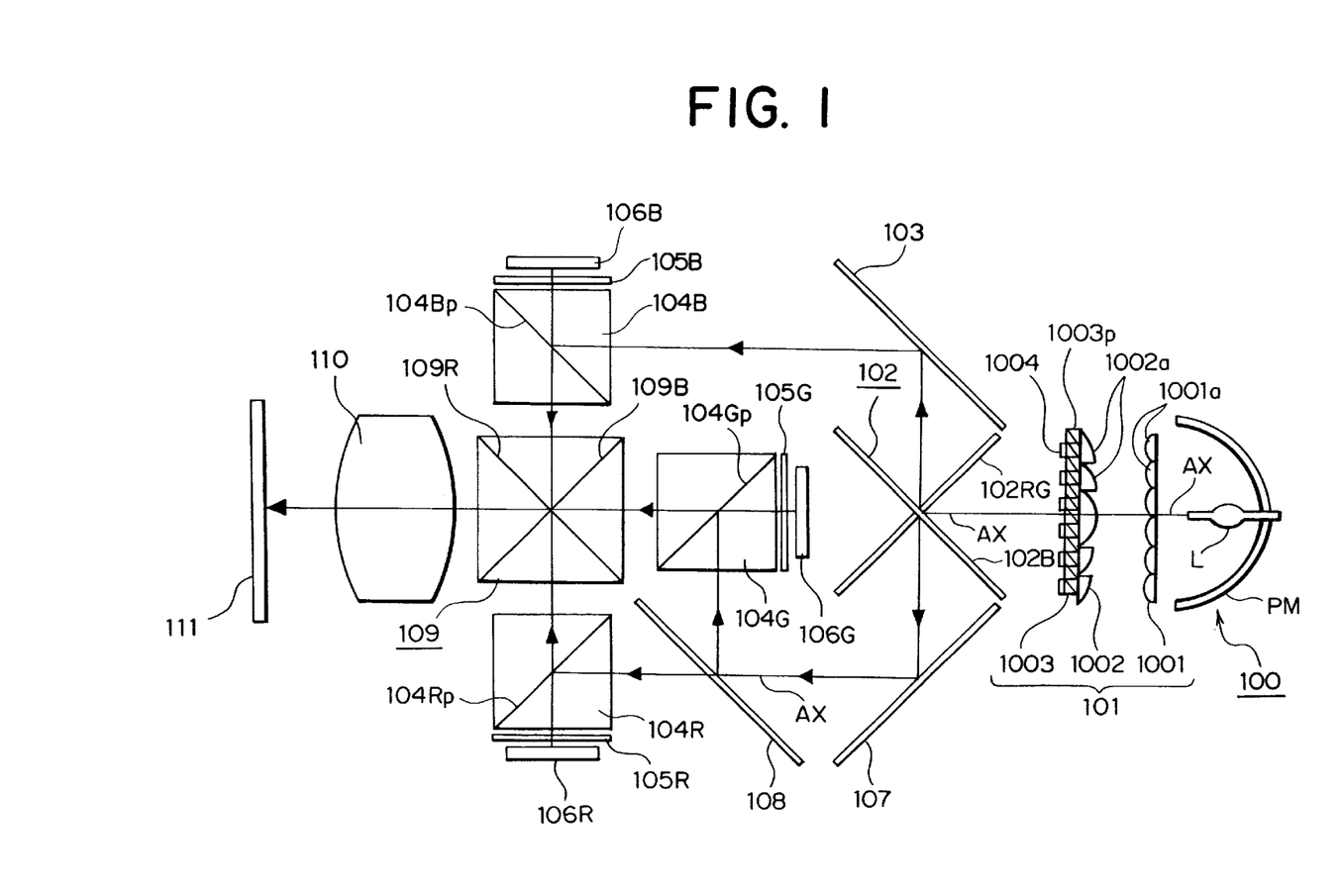
FIG. 1 is a diagram showing a construction of a projection type display apparatus in an embodiment of the present invention.

An embodiment of the present invention will hereinafter be discussed with reference to the accompanying drawings. FIG. 1 is a view showing an outline of a configuration of a projection type display apparatus in the embodiment of the present invention.

A light source 100 is constructed of a lamp L and a concave mirror PM formed in a parabolic shape. The light source 100 emits substantially a parallel beam of light along an optical axis AX. According to this embodiment, the concave mirror PM involves the use of a parabolic mirror, however, other types of concave mirrors such as an elliptical mirror and a spherical mirror may also be, as a matter of course, utilized. Note that a beam profile adjusting optical system for collimating the light beam emitted into the substantially parallel light beam be, it is preferable, used in the case of utilizing the elliptical mirror and the spherical mirror.

The light beam from the light source 100 enters a polarization converting unit 101 for converting a polarization state of the light beam into a single linearly polarized light beam. The polarization converting unit 101 converts the incident light beam into S-polarized light beam.

The polarization converting unit 101 is constructed of a first lens plate 1001, a second lens plate 1002, a polarization beam splitter array 1003 and half wave plates 1004.

The first lens plate 1001 is configured by arranging in plane a plurality of lens elements 1001a of which an external shape corresponds to a proportional reducing shapes of irradiated areas of reflection type light valves which will be explained later on. Further, a plurality of lens elements 1002a corresponding to the lens elements 1001a and configuring the second lens plate 1002 are disposed in focal positions of the respective lens elements 1001a. With this layout, luminous points are formed on the plurality of lens elements 1002a of the second lens plate 1002.

Beams of light emitted from the luminous points on the second lens plate 1002 enter the polarization beam splitter array 1003 disposed in the vicinity of an exit surface of the second lens plate 1002. The polarization beam splitter array 1003 is configured by arranging a plurality of polarization beam splitter elements 1003p in array. A length of one side in section of the polarization beam splitter element 1003p is half a length of the lens element 1002a. Further, the layout is that a central position of the polarization beam splitter element 1003p is substantially coincident with a position of boundary at which the lens elements 1002a are adjoining to each other.

The respective beams of light emitted from the luminous points on the plurality of lens elements 1002a enter the polarization beam splitter elements 1003p disposed facing to the respective lens elements 1002a. Polarization separating surfaces of the polarization beam splitter element 1003p transmit P-polarized light beams but reflect the S-polarized light beams among the incident light beams. The transmitted P-polarized light beams exit the polarization beam splitter element 1003p. The half wave plates 1004 are disposed at the respective exit surfaces of the P-polarized light beams. The half wave plates 1004 covert the P-polarized light beams into the S-polarized light beams and let the S-polarized light beams exit.

Further, the S-polarized light beams reflected by the polarization separating surfaces of the polarization beam splitter element 1003p, enter the adjoining polarization beam splitter elements 1003p, respectively. The polarization separating surface of each adjoining polarization beam splitter element 1003p reflects the S-polarized light beam and lets it exit. The light beam from the light source 100 is thus converted into the S-polarized light beam defined as substantially the single polarized light beam.

The light source beam emitted and traveling via the polarization converting unit 101 enters a cross dichroic mirror 102. The cross dichroic mirror 102 has such a configuration that R- and G-light beam reflecting dichroic mirror 102RG and a B-light beam reflecting dichroic mirror 102B are disposed in an X-shape orthogonally to each other at 45 degrees to the incident optical axis AX.

The light source beam having entered the cross dichroic mirror 102 is color-separated into R- and G-light beam and the B-light beam that are each perpendicular to the incident optical axis and travel in the directions opposite to each other. The B-light beam is reflected by a deflection mirror 103 in a way that deflects its traveling direction, and enters a polarization beam splitter 104B.

Further, the R- and G-light beam is deflected in their traveling direction by a deflection mirror 107, then travels toward a G-light beam reflecting dichroic mirror 108 disposed at an angle of 45 degrees to the optical axis AX and enters this mirror 108. The G- and R-light beam is color-separated into the R-light beam transmitting the G-light beam reflecting dichroic mirror 108 and the G-light beam reflected at a right angle by this mirror 108 and traveling in a way that thus deflects its traveling direction.

The color-separated R- B- and G-light beams enter polarization beam splitters 104R, 104B, 104G for color light beams R, B and G, respectively, and undergo polarization separating action therein. The S-polarized light beam components reflected by the polarization beam splitters 104R, 104B, 104G for the respective color light beams enter reflection type light valves 106R, 106B, 106G for the color light beams via quarter wave plates 105R, 105B, 105G for the color light beams disposed in the vicinities of the exit surfaces of the polarization beam splitters for the respective color beams. The quarter wave plates 105R, 105B, 105G for the color light beams will be explained in depth later on. Note that the P-polarized light beams transmitting the polarization beam splitters 104R, 104B, 104G for the respective color light beams are discarded.

Herein, the reflection type light valves 106B, 106R, 106G for the respective color light beams will be explained. The reflection type light valves utilized in this embodiment are classified as electric writing mode reflection type light valves. The electric writing mode reflection type light valve has a modulation layer composed of a liquid crystal layer, and is constructed of reflection mirror layers provided under this modulation layer and serving as electrodes that define respective pixels, and of a non-linear element such as switching TFTs etc disposed under the reflection mirror layers. Then, with application of a voltage through the non-linear element, liquid crystal molecules existing in the modulation layer get arrayed within this modulation layer corresponding to the pixels selected by a color signal for each of the colors, whereby the liquid crystal layer functions as a quarter wave plate. The single polarized light beam (which is the S-polarized light beam in this embodiment) incident on this portion from upward) is converted by the modulation layer into a circularly or elliptically polarized light beam. Then, this polarized light beam is reflected by the reflection mirror and passes through again the modulation layer, whereby the beam is converted into the single polarized light beam exhibiting a predetermined oscillating direction different from that of the incident polarized light beam. A ratio of the S-polarized light beam component to the P-polarized light beam component of the same single polarized light beam, is determined by the predetermined oscillating direction different from that of the incident polarized light beam, thereby making it possible to adjust a quantity of the transmitted light beam (a quantity of the P-polarized light beam) transmitting the polarization light beam splitter.

If the voltage applied is zero, the liquid crystal molecules in the modulation layer keep an initial state of the array. Accordingly, the linearly polarized light beam incident on this portion travels along a torsion of the liquid crystal molecules as it is, and, after being reflected by the reflection mirror, further travels as this torsional structure guides. Then, the light beam exits as the linearly polarized light beam (the S-polarized light beam in this embodiment) exhibiting the same polarizing direction as that of the incident polarized light beam. A case that the color light beams to be projected assumes black, implies this state, which means that all or a large proportion of the above polarized light beams exiting and traveling via the quarter wave plate, are reflected by the polarization separating surface of the polarization beam splitters disposed corresponding to the respective color light beams and discarded outside without entering the projection lens.

The following is a relationship between a magnitude of the voltage applied across the modulation layer and a state of the light beam. If the voltage applied across the modulation layer is increased gradually from the zero-state, the beam of light incident by the linear polarization (the S-polarization in this embodiment) is gradually converted from the linearly polarized light beam into a thin elliptically polarized light beam, a thick elliptically polarized light beam and a circularly polarized light beam, consecutively. When passing through again the modulation layer, it follows that the light beam is converted in the same sequence consecutively into the linearly polarized light beam having the same polarizing direction as that of the incident linearly polarized light beam, the linearly polarized light beam having the same polarizing direction as that of the incident linearly polarized light beam, the linearly polarized light beam having a polarizing direction rotated through 30° with respect to the oscillating direction of the incident linearly polarized light beam, the linearly polarized light beam having a polarizing direction containing an oscillating direction rotated through 60° with respect to the incident linear polarization, and a linearly polarized light beam (the P-polarized light beam in this embodiment) having the incident linearly polarized light beam and an oscillating direction rotated through 90° with respect to the incident linear polarization, wherein an intensity of each color beam is determined depending on the polarizing direction thereof.

The color light beam assuming a half tone herein indicates a color light beam in a state of having a predetermined inclination to the linearly polarized light beam that has exited the light valve for each color and enters the light valve for each color.

The light beams entering the reflection type light valves 106R, 106B, 106G for the respective color light beams, are modulated corresponding to image signals for the individual colors. The reflected and exited light beams containing these modulated light beams travel via the respective quarter wave plates 105R, 105B, 105G for the color light beams, and enter again respectively the polarization beam splitters 104R, 104B, 104G for the respective color light beams.

The polarization separating surface of each of the polarization beam splitters 104R, 104B, 104G for the respective color light beams, analyzes by transmitting only the modulated light beam. Further, the light beams (non-modulated beam) reflected by the respective polarization separating surfaces are discarded toward the light source. Next, the analyzed color beams enter a cross dichroic prism 109 classified as a color synthesizing optical system.

The cross dichroic prism 109 has such a configuration that B- and R-light beam reflecting dichroic films 109B and 109R are disposed in an X-shape orthogonally to each other at 45 degrees to the incident optical axis. The B-light beam reflecting dichroic film 109B reflects the B-light beam but transmits the G- and R-light beams. The R-light beam reflecting dichroic film 109R reflects the R-light beam but transmits the G- and B-light beams. With this contrivance, the cross dichroic prism 109 color-synthesizes the light beams from the reflection type light valves 106R, 106B, 106G for the respective color light beams and let these light beams exit toward the projection lens 110. The projection lens 110 projects on a screen 111 a full-color image of the images formed on the projection image field planes of the reflection light valves 106R, 106B, 106G for the respective color light beams.

Next, the quarter wave plates 105R, 105B, 105G for the color light beams will be explained in detail. To start with, it is quite important in terms of discussing the invention of the present application to analyze a cause of ununiformity in color that occurs at the four corners of the projected image. Therefore, the occurrence of the ununiformity in color will be explained in depth before describing the quarter wave plates 105R, 105B, 105G for the color light beams in this embodiment.

A contemplation is given herein to the conventional projection type display apparatus touched upon in Related Background Art in this specification, wherein the ununiformity in color occurred. A detection of the ununiformity in color involves, in the projection type display apparatus in this embodiment discussed above, such an architecture that the quarter wave plates 105R, 105B, 105G for the color light beams are disposed as in the case of the conventional projection type display apparatus, and reflection mirrors formed by vapor-depositing aluminum on glass substrates are disposed as substitutes for the reflection type light valves 106R, 106B, 106G for the color light beams and project the color light beams, respectively. The mirror formed by vapor-depositing aluminum has a performance approximate to an ideal reflection mirror, and hence the light beam incident on this mirror is not modulated but reflected in a way that keeps a polarized state of the light beam exiting the quarter wave plate, and reenters the quarter wave plate for each color beam.

The discussion will be focused on a layout with respect to a phase advance (fast) axis (or a phase delay (slow) axis) of the quarter wave plate for each color light beam in the case where the ununiformity in color occurs. The quarter wave plate is disposed in a light path between the mirror and the polarization beam splitter. Then, the quarter wave plate is disposed so that the incident surface and the exit surface of the light beam are disposed perpendicularly to the optical axis, and the phase advance axis (fast axis) in the vicinity of a portion (substantially a central portion of the quarter wave plate) at which the quarter wave plate intersects the optical axis, is disposed in parallel to the sheet surface (The term "sheet surface" used in the present specification throughout means a surface of a paper sheet of drawing.), i.e., the phase advance axis is disposed perpendicularly to the sheet surface. In this quarter wave plate, an indicating direction of the phase advance axis based on an external shape thereof is not completely coincident with an actual crystal orientation. It is therefore difficult to mechanically determine the direction of the phase advance axis. Hence, the layout of the quarter wave plate is adjusted in the following steps.

Figure 3:
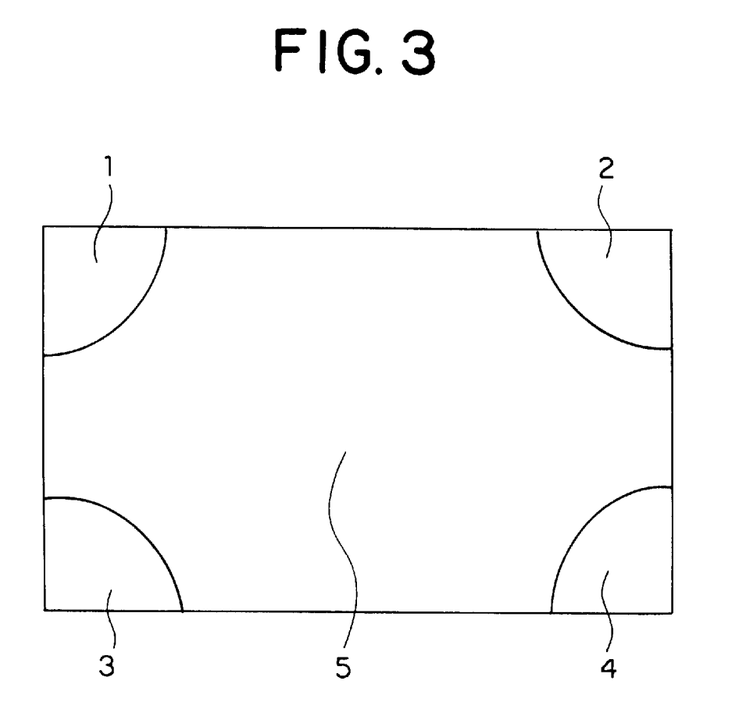
FIG. 3 is a diagram showing areas on a screen.

To begin with, all the color light beams are made incident upon the mirrors described above, and all the external-shape-indicative phase advance axes of the quarter wave plates for the respective color light beams, are disposed substantially in parallel to the sheet surface. Next, each of the quarter wave plates for the respective color beams is rotated per color beam about the optical axis through several degrees through several tens degrees. Then, the quarter wave plate is halted just when a central area on the screen 111 as shown in FIG. 3 becomes blackish most while observing this area. Finally, the quarter wave plate is fixed in this position where the phase advance axis gets parallel to the sheet surface. The blackish state has been explained in the discussion on the light valve.

Herein, five areas such as a left upper corner area 1, a right upper corner area 2, a left lower corner area 3, a right lower corner area 4 and the central area 5 as illustrated in FIG. 3, will be considered in order to describe a state of the image projected on the screen 111. When adjusting the position of the quarter wave plate in the steps described above, the central area 5 becomes blackish. By contrast, the left upper corner area 1, the right upper corner area 2, the left lower corner area 3 and the right lower corner area 4, it is observed, assume bright (which is so-called "floating" (with the black color unfixed)) as compared with the ideal blackish state of the central area 5. Thus, the whole screen 111 is unable to become blackish uniformly. This implies that the phase advance axis in the central area 5 of the quarter wave plate is not parallel to the phase advance axis in each of the four corner areas 1, 2, 3 and 4.

In this state, only one specified color light beam is allowed to enter the mirror. At the same time, the incidences of other color light beams on the mirrors are cut off. Then, the image formed of one specified color light beam is projected on the screen 111. Next, the quarter wave plate corresponding to this one specified color light beam is rotated about the optical axis (which corresponds to a half-tone projection with respect to the central area 5). What is done at first is an observation of the projected image by rotating the quarter wave plate concerned through several degrees through a ten and several degrees in the first direction. This implies that the direction of the phase advance axis of the central area 5 of the quarter wave plate is inclined in the first direction to the sheet surface.

At the first onset, the B-light beam is singly projected, and the quarter wave plate for the B-light beam is rotated in the first direction. As this quarter wave plate is rotated on, the blackish state of the central area 5 becomes bright (gets floating). By contrast, the blackish state in each of the left upper and right lower corner areas 1 and 4 darkens. Further, the blackish state in each of the right upper and left lower corner areas 2 and 3 becomes brighter (more floating) than in the central area 5.

Next, the quarter wave plate is rotated in a second direction opposite to the first direction. As the quarter wave plate is rotated on, the blackish state in each of the central area 5 and areas of the right upper and left lower corners 1 and 4 becomes bright (gets floating). Moreover, the blackish state in each of the right upper and left lower corner areas 2 and 3 darkens.

In the case of singly projecting the R-light beam, a relationship between the rotating direction of the quarter wave plate, and the areas and the state of how the color brightness changes, is the same as in the case of singly projecting the B-light beam.

Next, the G-light beam is singly projected, and the same operations are performed. In the case of singly projecting the G-light beam, the relationship between the rotating direction of the quarter wave plate, and the areas and the state of how the color brightness changes, is different from the case of singly projecting the B- or R-light beam. At first, the quarter wave plate is rotated in the first direction. At this time, the blackish state in each of the left upper and right lower corner areas 1 and 4 becomes bright (floating). In contrast with this, the blackish state in each of the right upper and left lower corner areas 2 and 3 more darkens.

Further, when the quarter wave plate is rotated in a second direction opposite to the first direction, the blackish state in each of the right upper and left lower corner areas 2 and 3 becomes bright (floating). In contrast with this, the blackish state in each of the left upper and right lower corner areas 1 and 4 more darkens.

Thus, if all the quarter wave plates for the respective color beams are inclined in the first or second direction, the way of which state, bright or dark, appears is opposite depending on the R-, B- and G-light beams, with the result that the ununiformity in color occurs. Namely, the area in which the R- and B-light beams become bright or dark is opposite in direction to the area in which the G-light beam becomes bright or dark. Hence, if all the quarter wave plates for the respective color light beams are inclined in the first direction, a green color tone increases in the left upper and right lower corner areas 1 and 4, and a magenta color tone increases in the right upper and left lower corner areas 2 and 3. This behavior becomes opposite if inclined in the second direction. As described above, the ununiformity in color occurs in the diagonal positions on the screen 111.

Based on these facts, the inventor of the present application acquired conclusions (1) and (2) that follow.

Figure 4:
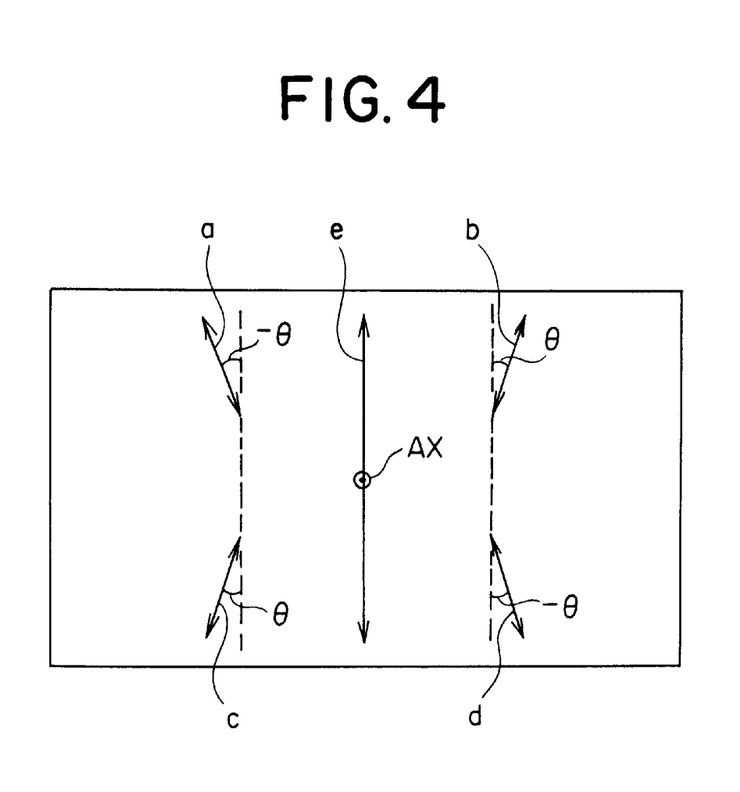
FIG. 4 is a diagram showing directions of the phase advance axes of the quarter wave plate.

Conclusion (1):

In the quarter wave plate disposed for each color light beam, a direction of a phase advance axis (fast axis) e in the central area and directions of phase advance axes a, b, c, d in the four corner areas are, as shown in FIG. 4, not parallel but inclined to each other. Then, the phase advance axes a, d in the two corner areas (e.g., the left upper and right lower corner areas 1, 4) are inclined in the same direction. By contrast, the phase advance axes b, c in the other diagonal two corner areas (e.g., the right upper and left lower corner areas 2, 3) are inclined in the same directions, however, the inclined angles thereof are set in linear symmetry to the phase advance axes a, d with respect to the phase advance axis e.

Figure 2A:
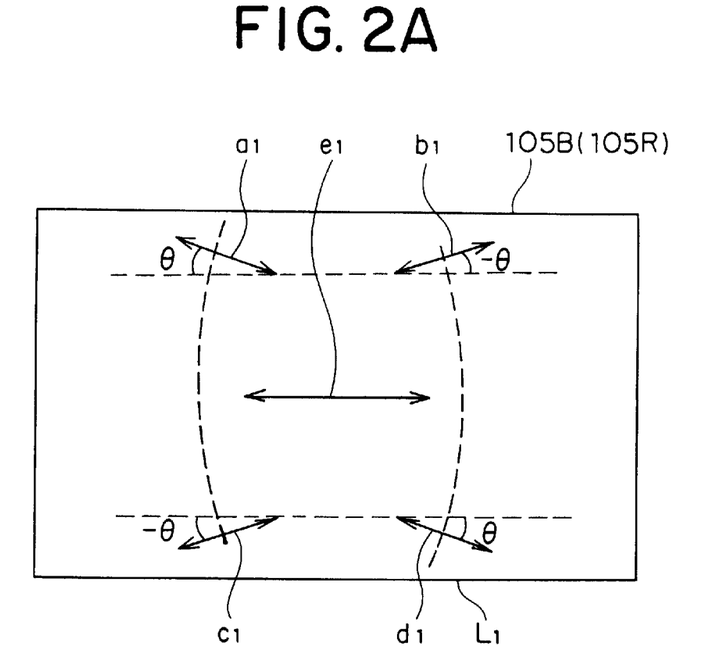
FIGS. 2A and 2B are diagrams showing directions of phase advance axes of a quarter wave plate in the embodiment of the present invention.
Figure 2B:
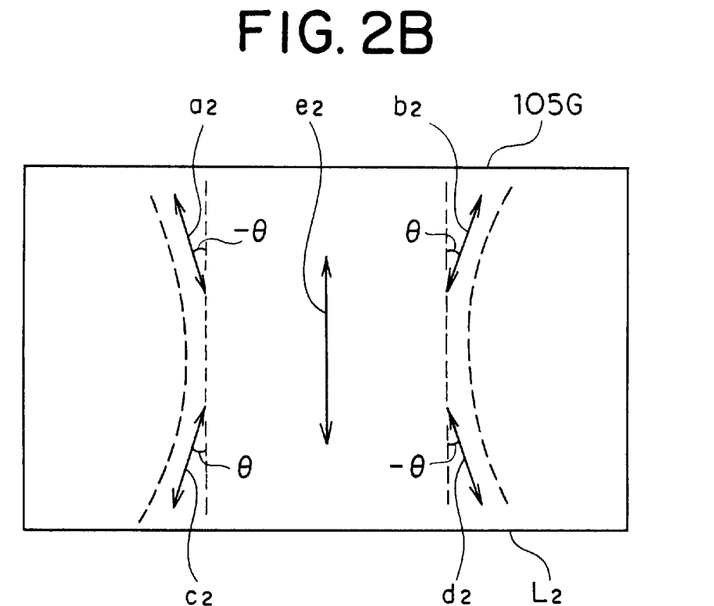

Thus, it has empirically proved that the phase advance axis (or the phase delay axis (slow axis)) is inclined in a barrel-like shape (as depicted by dotted lines in FIG. 2A) (or inclined in a spool-like shape as depicted by doted lines in FIG. 2B). What is presumed as a cause of this is that when cutting a large phase plate in a predetermined configuration and to a predetermined size in the process of manufacturing the quarter wave plate, the above-mentioned inclination of the phase advance axis might occur. The external shape of the quarter wave plate shown in the Figures in the embodiment is rectangular, however, it has the same tendency even if circular or otherwise.

Conclusion (2):

The ununiformity in color occurs due to two factors overlapped. The first factor is that the diagonal ununiformity in color on the screen occurs due to the difference in the inclined direction between the phase advance axes in the four corner areas of the quarter wave plate. Further, the second factor is derived from a positional relationship between the cross dichroic prism constituting the color synthesizing optical system and the reflection type light valves for the respective color light beams.

Referring back to FIG. 1, the second factor will be elucidated in greater detail. The light beams exiting the B-light beam reflection type light valve 106B and the R-light beam reflection type light valve 106R, transmit the polarization beam splitters 105B, 105R respectively and enter the cross dichroic prism 109. Then, the B-light beam undergoes the reflecting action once on the dichroic film 109B and exits the surface of the cross dichroic prism 109 on the side of the projection lens 110. The R-light beam undergoes the reflecting action once on the dichroic film 109R and exits the surface of the cross dichroic prism 109 on the side of the projection lens 110. On the other hand, the G-light beam travels through the polarization beam splitter 104G, then transmits the two dichroic films 109B, 109R after entering the cross dichroic prism 109, and exits the surface of the cross dichroic prism 109 on the side of the projection lens 110.

Accordingly, with respect to the projection images, positions of specified conjugate points on the B- and R-light beam reflection type light valves 106B, 106R are opposite in terms of right-and-left relation to a position of a specified conjugate point on the G-light beam reflection type light valve 106G. Namely, the images on the B- and R-light beam reflection type light valves 106B, 106R have a right-and-left inverted relationship with the image on the G-light beam reflection type light valve 106G.

Now it is assumed that the phase advance axes of the quarter wave plates 105B, 105R, 105G for the respective color light beams are disposed in the directions as illustrated in FIG. 4, while the oscillating direction of the S-polarized light beams is perpendicular to the paper sheet surface of FIG. 1 in the projection type display apparatus in FIG. 1. As shown in FIG. 4, the inclined angles of the phase advance axes a, b, c, d in the four corner areas with respect to the phase advance axis e are θ or −θ (where θ is set clockwise). If all the quarter wave plates 105R, 105G, 105B for the respective color light beams are rotated clockwise about the axis AX through just θ, the left upper and right lower advance phase axes a, d of the quarter wave plates for the color light beams become perpendicular to the sheet surface of FIG. 1, the phase advance axis e in the central area is inclined at θ, and the right upper and left lower phase advance axes b, c are inclined at 2θ to the line perpendicular to the sheet surface. Herein, when the S-polarized light beam perpendicular to the sheet surface is incident, the left upper and right lower phase advance axes a, d of the quarter wave plate are parallel to the oscillating direction, and hence the light beam reflected by the reflection mirror exits the quarter wave plate for each color beam as it is. On the other hand, the phase advance axis e in the central area of the quarter wave plate for each color beam is inclined at θ to line perpendicular to the sheet surface, and the right upper and left lower phase advance axes b, c are inclined at 2θ to the sheet surface. Therefore, the S-polarized light beams incident on these areas become elliptically polarized light beams and are reflected by the reflection mirror, and the polarized light beams respectively having an oscillating direction −θ and an oscillating direction −2θ to the line perpendicular to the sheet surface, exit the quarter wave plate for each color light beam. Accordingly, among the light beams transmitting the polarization beam splitter via the quarter wave plate for each color beam, the light beams coming from the areas corresponding to the left upper and right lower areas of the light valve for each color come to the blackish state, the light beam from the central area assumes the bright (floating) state, and the light beams from the areas corresponding to the right upper and left lower areas become a brighter (more floating) state. Herein, as explained above, in the architecture shown in FIG. 1, since the images on the B- and R-light beam reflection type light valves 106B, 106R have the right-and-left inverted relationship with the image on the G-light beam reflection type light valve 106G, the left upper and right lower areas of the G-light beam projected image assume the blackish state while the right upper and left lower areas thereof assume the bright (floating) state, and in this case the left upper and right lower areas of the R- and B-light beam projected images become the bright (floating) state while the right upper and left lower areas thereof become the blackish state, wherein the surface of the cross dichroic prism on the side of the projection lens 110 is set as a front side. Thus, the way of how the ununiformity in color with respect to the rotating direction of the quarter wave plate for each color light beam appears, is different depending on a difference between the positions of the conjugate points through the R-, B- and G-light beams, which is the cause of the ununiformity in color on the screen 111.

In view of a result of the examination made so far, the inventor of the present application considered that in the projection type display apparatus as illustrated in FIG. 1, the directions of the phase advance axes in the central areas of the quarter wave plates 105B, 105R disposed for the B- and R-light beams and of the quarter wave plate 105G disposed for the G-light beam, are inclined at 90 degrees, thereby making it possible to restrain the occurrence of the uniformity in color in the half tone that is attributed to the inclinations of the phase advance axes existing in the four corner areas of the quarter wave plate for each color light beam.

To be specific, the quarter wave plates having the phase advance axes as illustrated in FIG. 4 are disposed as the quarter wave plates 105R, 105G, 105B for the respective color beams in the projection type display apparatus in FIG. 1, the phase advance axis e in the central area of only the quarter wave plate 105G for the G-light beam is rotated clockwise through 90 degrees about the central axis. As a result, the phase advance axes e in the central areas of the phase plates 105B and 105R become perpendicular to the sheet surface, while the phase advance axis e of the plate 105G gets parallel to the sheet surface. Further, with the rotation of the quarter wave plates 105G for the G-light beam, a positional corresponding relationship between the phase advance axes a, b, c, d in the four corner directions is that the phase advance axis c of the quarter wave plate for the G-light beam corresponds to the phase advance axes a of the quarter wave plates for the R- and B-light beams, the phase advance axis a of the quarter wave plate for the G-light beam corresponds to the phase advance axes b of the quarter wave plates for the R- and B-light beams, the phase advance axis d corresponds to the phase advance axes c, and the phase advance axis b corresponds to the phase advance axes d. Herein, as described above, the images on the light valves for R-, B- and G-light beams are inverted in their right/and-left relationship, and hence, when observing behaviors of distortions in the four corner areas of the quarter wave plates that correspond to each other and have their conjugate points, it can be comprehended that the phase advance axes on the conjugate points have a relationship of being orthogonal to each other. The phase delay axis has, though not illustrated, a relationship having a vertical direction with respect to the phase advance axis at each corresponding point, and therefore one phase advance axis (phase delay axis) is parallel to the other corresponding phase delay axis (phase advance axis) at every conjugate point.

Thus, in a state where the quarter wave plates 105R, 105B, 105G for the respective color light beams are disposed, all the quarter wave plates 105R, 105B, 105G for the respective color light beams are rotated clockwise through θ about the central axis AX. Then, the phase advance axes a, d of the quarter wave plates 105R, 105B, for the R- and B-light beams are perpendicular to the sheet surface (the phase delay axes are, though not illustrated, perpendicular to the phase advance axes a, d and horizontal to the sheet surface), and the phase advance axes b, c thereof are inclined at 2θ to the perpendicular line of the sheet surface (the phase delay axes are, though not shown, perpendicular to b, c and inclined at 2θ to the sheet surface). Then, the light beams transmitting the polarization beam splitter form the blackish state in the left upper and right lower areas, and the bright (floating) state in the right upper and left lower areas. On the other hand, the phase advance axes a, d of the quarter wave plate 105G for the G-light beam are parallel to the sheet surface (the phase delay axes are, though not illustrated, perpendicular to the phase advance axes a, d and also perpendicular to the sheet surface), and the phase advance axes c, b thereof are inclined at 2θ to the sheet surface (the phase delay axes are, though not shown, perpendicular to c, b and inclined at 2θ to the perpendicular line of the sheet surface). Hence, the light beams transmitting the polarization beam splitter form the blackish state in the right upper and left lower areas, and the bright (floating) state in the right upper and left lower areas to the same extent as in the right upper and left lower areas of the quarter wave plates for the B- and R-light beams. The reflection type light valves 106R, 106B for the R- and B-light beams have the right-and-left inverted relationship with the refection light valve 106G for the G-light beam. Hence, as for the states described above, in the layout that the cross dichroic prism surface on the side of the projection lens is defined as the front side; the G-light beam projected image assumes the blackish state in the right upper and left lower areas and the bright (floating) state in the left upper and right lower areas. The R- and B-light beam projected images similarly assume the blackish state in the right upper and left lower areas and the bright (floating) state in the left upper and right lower areas. Nevertheless, the brightness behaviors and intensities of all the color R-, G- and B-light beams are uniformed, and the respective colors are well balanced over the entire surface, whereby the ununiformity in color of the projected image can be prevented.

When all the quarter wave plates 105R, 105B, 105G for the respective color light beams are rotated counterclockwise through θ about the central axis, the left lower and right upper areas get bright by the synthesized beams defined above, and, just with a reversion of the bright/dark areas to the previous case, the brightness behaviors with respect to all the color light beams are uniformed.

Herein, the layout is that the phase advance axes of the quarter wave plates for the R- and B-light beams are parallel to the sheet surface while the phase advance axis of the quarter wave plate for the G-light beam is perpendicular to the sheet surface, however, the same effect can be, as a matter of course, obtained by the reversed layout.

As discussed above, according to the present invention, with respect to the directions of the phase advance/delay axes in the conjugate positions of the quarter wave plates for the R- and B-light beams and the quarter wave plate for the G-light beam, the direction of one phase advance axis (phase delay axis) is parallel to the direction of the other phase delay axis (phase advance axis). When the quarter wave plates are rotated in the same direction, i.e., when the linearly polarized light beams having the predetermined oscillating direction are incident, the angles made by the linearly polarized light beam and by one phase advance axis and the other phase delay axis existing on the conjugate point are the same. Hence, the light beams exhibiting the same intensity ratio among the R-, G and B-light beams are projected, whereby no ununiformity in color occurs over the entire surface of the projection screen.

Next, the layout of the quarter wave plates in this embodiment will be explained in depth with reference to FIGS. 1, 2A and 2B.

FIGS. 2A and 2B show, with the light source 100 back, the directions of the phase advance axes in the case of viewing the quarter wave plates 105R, 105B, 105G for the respective color light beams and the reflection type light valves 106R, 106B, 106G for the respective color light beams. FIG. 2A is the diagram showing the directions of the phase advance axes of the quarter wave plates 105R, 105B for the R- and B-light beams. Further, FIG. 2B is the diagram showing the directions of the phase advance axes of the quarter wave plate 105G for the G-light beam.

As shown in FIG. 2A, a direction of a major side L1 of the rectangle is substantially parallel to a direction of a phase advance axis e1 in the central area of each of the quarter wave plates 105R, 105B for the R- and B-light beams. Further, as shown in FIG. 2B, in the quarter wave plate 105G for the G-light beam, a direction of a major side L2 of the rectangle is substantially perpendicular to a direction of a phase advance axis e2 in the central area thereof.

In the projection type display apparatus in this embodiment as illustrated in FIG. 1, the quarter wave plates 105R, 105B for the R- and B-light beams are laid out so that the phase advance axis e1 in the central area is directed substantially perpendicularly to the sheet surface in FIG. 1. The quarter wave plate 105G for the G-light beam is laid out so that the phase advance axis e2 in the central area is directed substantially in parallel to the sheet surface in FIG. 1.

Given next is an explanation of steps of adjusting the layout of the quarter wave plates 105R, 105B, 105G for the respective color light beams. The discussion starts with touching on adjusting the layout of the quarter wave plate 105B for the B-light beam. Light shielding members are inserted into the light paths of the light beams entering the reflection type light valves 106R, 106G for the R- and G-light beams among the color-separated R-, B- and G-light beams. With this contrivance, only the B-light beam arrives at the reflection type light valve 106B for the B-light beam. Next, the voltage applied to the reflection type light valve 106B for the B-light beam is set OFF (i.e., a mirror-state). In this state, the B-light beam projected image on the screen 111 is observed.

The layout is, as described above, that in the quarter wave plate 105B for the B-light beam, as explained above, the longitudinal direction of the external shape of the rectangular phase plate is substantially parallel to the direction of the phase advance axis e1 in the central area; the longitudinal direction of the quarter wave plate 105B for the B-light beam is substantially parallel to the direction of the major side of the reflection type light valve 106B for the B-light beam; and the longitudinal direction of the quarter wave plate 105B for the B-light beam is substantially perpendicular to the sheet surface. The quarter wave plate 105B for the B-light beam is rotated from this state through ± several degrees to θ about the optical axis. Then, the quarter wave plate 105B for the B-light beam is fixed in a position where the central area 5 darkens most on the screen 111.

Next, the layout of the quarter wave plate 105R for the R-light beam is adjusted. The light shielding members are inserted into the light paths of the light beams entering the reflection type light valves 106B, 106G for the B- and G-light beams among the color-separated R-, B- and G-light beams. With this contrivance, only the R-light beam arrives at the reflection type light valve 106R for the R-light beam. The subsequent adjusting steps are the same as those for the quarter wave plate 105B for the B-light beam, and hence their repetitive explanations are omitted.

Next, the adjustment of the layout of the quarter wave plate 105G for the G-light beam will be described. The light shielding members are inserted into the light paths of the light beams entering the reflection type light valves 106R, 106B for the R- and B-light beams among the color-separated R-, B- and G-light beams. With this contrivance, only the G-light beam arrives at the reflection type light valve 106G for the G-light beam. The quarter wave plate 105G for the G-light beam is disposed so that the longitudinal direction of the external shape of the rectangular phase plate is substantially perpendicular to the direction of the phase advance axis e2 in the central area, the longitudinal direction of the quarter wave plate 105G for the G-light beam is substantially parallel to the direction of the major side of the reflection type light valve 106G for the G-light beam, and the longitudinal direction of the quarter wave plate 105G for the G-light beam is substantially perpendicular to the sheet surface.

Next, the voltage applied to the reflection type light valve 106G for the G-light beam is set OFF (i.e., the mirror-state). Then, the G-light beam is made incident on the reflection type light valve 106G for the G-light beam and reflected therefrom, and the screen 111 is observed. Herein, the quarter wave plate 105G for the G-light beam is rotated through ± several degrees to θ about the optical axis, and is fixed in a position where the central area 5 darkens most on the screen 111.

The adjustments of the layouts of the quarter wave plates 105R, 105B, 105G for the respective color light beams are completed through the steps described above.

In a state with the above adjustments finished, there might be case where the directions of the phase advance axes e1, e2 in the central areas of the quarter wave plates 105R, 105B, 105G for the respective color light beams are neither parallel nor perpendicular to the directions of the major sides of the reflection type light valves 106R, 106B, 106G for the respective color light beams. The reason why so is that the liquid crystal molecules existing in the liquid crystal layer used as the modulation layer of each of the reflection type light valves 106R, 106B, 106G for the respective color light beams normally have a so-called pre-tilt in the OFF-state (the mirror state) of the voltage applied. A magnitude of the pre-tilt differs depending on a type of the liquid crystal used. Hence, there occurs a difference between the directions of the phase advance axes e1, e2 in the central areas after being adjusted so as to darken most in the central area and the directions of the major sides of the reflection type light valves 105R, 105B, 105G for the respective color light beams. Normally this angular difference is approximately 3 degrees.

Herein, there is a case in which the liquid crystal molecules existing in the liquid crystal layer configuring the modulation layer of each of the reflection type light valves 106R, 106B, 106G for the respective color light beams, have a large pre-tilt in the initial state (when the voltage applied is set OFF). In this case, even when the quarter wave plate for each color light beam is disposed and rotated through several degrees to θ about the optical axis in order to attain the blackish state, the brightness (floating) in the central area 5 on the screen 111 does not disappear, and the blackish state can not be attained. In this case, a wavelength plate other than the quarter wave plate for each color light beam is disposed in consideration of a quantity of the pre-tilt. This schemes to, it is preferable, perform a function as the quarter wave plate by combining the above wavelength plate with the quantity of the pre-tilt. In this case also, the directions of the phase advance axes in the central areas of the quarter wave plates 105R, 105B for the R- and B-light beams and the direction of the phase advance axis in the central area of the quarter wave plate for the G-light beam, are set about 90° to each other.

According to this embodiment, the reflection type light valve 106G for the G-light beam configures a first light valve group that lets the light beam exit which makes none of reflection throughout the light path till the light beam exits the polarization beam splitter 104G for the G-light beam and the cross dichroic prism 109 which are defined as a color synthesizing analyzing optical system since the light beam exited the reflection type light valve 106G for the G-light beam. Herein, the first light valve group is not limited to the none-of-reflection mode and functions the same in an even-numbered reflections mode.

The reflection type light valve 106R for the R-light beam and the reflection type light valve 106B for the B-light beam configure a second light valve group that lets the light beam exit, which is reflected once throughout the light path till the beam exits the polarization beam splitters 104R, 104B for the R- and B-light beams and the cross dichroic prism 109 which are defined as a color synthesizing analyzing optical system since the light beam exited the reflection light valves 106R, 106B. Herein, the second light valve group is not confined to the reflected-once mode and functions the same in an odd-numbered reflections mode.

With respect to one of the first light valve group 106G which is being energized to effect displaying and the second light valve group 106R and 106B which are being energized to effect image-displaying, that is, with respect to the second light valve group 106R, 106B in the present embodiment, the phase advance axes e1 of the quarter wave plates 105R, 105B for the R- and B-light beams are disposed substantially in parallel to the predetermined axes within the surfaces of the R- and B-light beam oriented reflection type light valves 106R, 106B which axes correspond to the predetermined axes within the projection image field planes of the respective light valves 106R, 106B.

Further, in the remaining light valve group of the first light valve group 106G which is being energized to effect image-displaying and the second light valve group 106R, 106B which are being energized to effect image-displaying, that is, in the light valve group G2 in the present embodiment, the phase advance axis e2 of the quarter wave plate 105G for the G-light beam is disposed substantially perpendicularly to the predetermined axis within the surface of the G-light beam oriented reflection type light valve 106G which axis corresponds to the predetermined axis within the projection image field plane of the light valve 106G.

What is considered herein is a case of projecting a half tone color with respect to the R-, G- and B-light beams. As explained in the discussion on the reflection type light valves 106R, 106B, 106G, in the case of the half tone color, the oscillating direction of each of the R-, B- and G-light beams is that when entering the reflection type light valve and exiting the reflection type light valve after being reflected from the reflection mirror, the light beam becomes the linearly polarized beam having the oscillating direction deviated by a fixed angle to the phase advance or delay axis of the quarter wave plate. For an explanatory simplicity, now a case when α=−θ, is assumed. A relative layout of the quarter wave plates for the respective color light beams to the oscillating directions of the light beams, is equivalent to a case where all the quarter wave plates 105R, 105B, 105G for the respective color light beams are rotated clockwise through θ. In this case, with respect to the quarter wave plates 105R, 105B for the R- and B-light beams, the phase advance axes b1, c1 are perpendicular to the oscillating direction of the S-polarized light beams, phase advance axes a1, d1 have an angle of (90°+2θ) to the above oscillating direction, and the phase advance axis e1 has an angle of (90°+θ). Accordingly, with respect to the light beams transmitting the polarization beam splitters for the R- and B-light beams, the areas corresponding to the vicinities of the phase advance axes b1, c1 assume the blackish state, the area corresponding to the vicinity of the phase advance axis e1 becomes the bright (floating) state, and the areas corresponding to the vicinities of the phase advance axes a1, d1 become the brighter (more floating) state.

On the other hand, with respect to the quarter wave plate 105G for the G-light beam, it follows that the phase advance axes a2, d2 are parallel to the oscillating direction of the incident S-polarized light beam, the phase advance axes b2, c2 have the angle of 2θ to the above oscillating direction, and the phase advance axis e2 has the angle of θ. Accordingly, with respect to the light beam transmitting the polarization beam splitter for the G-light beam, the areas corresponding to the vicinities of the phase advance axes a2, d2 assume the blackish state, the area corresponding to the vicinity of the phase advance axis e2 becomes the bright (floating) state, and the areas corresponding to the vicinities of the phase advance axes b2, c2 become the brighter (more floating) state.

Herein, in the case of the layout of the quarter wave plates for the respective color light beams, there are established the conjugate relationships in their projected image between a1 and c2, between b1 and d2, between c1 and a2 and between d1 and b2. Accordingly, when all the quarter wave plates 105R, 105B, 105G for the respective color light beams are inclined at θ, the axes b1 and d2 and the axes c1 and a2 become the blackish state, the axes a1 and c2 and the axes d1 and b2 become bright state, whereby the brightness varying tendencies are uniformed with respect to all the color light beams. Further, the axes a1 and c2, the axes b1 and d2, the axes b1 and d2, the axes c1 and a2 and the axes d1 and b2 have the relationship in which one phase advance axis is parallel to the other phase delay axis, and hence, when the linearly polarized light beam having the oscillating direction containing the predetermined angle is incident on the conjugate point, there is kept the relationship between the oscillating direction of the linearly polarized light beam and the phase advance or delay axis of the quarter wave plate for each color light beam at every conjugate point with respect to each of the quarter wave plates 105R, 105B, 105G for the respective color light beams. Accordingly, as explained previously, there is the equal ratio of the S-polarized light beam (P-polarized light beam), and the intensities of the R-, B- and G-light beams are uniformed.

Thus, the inclinations, as illustrated in FIG. 2A, of the phase advance axes in the areas corresponding to the four corner areas of the reflection type light valves 106B, 106R for the B- and R-light beams, are parallel at the respective conjugate points to the inclinations, as illustrated in FIG. 2B, of the phase delay axes in the areas corresponding to the four corner areas of the reflection type light valve 106G for the G-light beam. Hence, the intensities of the respective color beams are uniformed over the entire surface of the projected image. Even when the blackish state in the central area 5 carries the half tone, all the colors brighten (or darken) to the same extent in the conjugate positions in the four corner areas on the screen 111, and therefore the occurrence of the ununiformity in color can be reduced over the entire surface. In this case, there is a slightly different contrast between the four corner areas and the central area, however, the human eyes are insensitive to a subtle difference in contrast, and therefore any problem about this difference does not arise.

The layout in the embodiment discussed above is that the directions of the phase advance axes in the quarter wave plates for the R- and B-light beams are set as shown in FIG. 2A, and the directions of the phase advance axes in the quarter wave plate for the G-light beam are set as shown in FIG. 2B. The embodiment of the present invention is not, however, limited to this layout, and the same effects as those exemplified in the embodiment are exhibited even by laying out the quarter wave plate 106G for the G-light beam as shown in 2A and the quarter wave plates 106B, 106R for the B- and R-light beams as shown in FIG. 2B.

As discussed above, according to the present invention, it is possible to provide the color synthesizing optical system and the projection type display apparatus each constructed to reduce the ununiformity in color.

What is claimed is:

1. A color synthesizing optical apparatus comprising:
   a plurality of reflection type light valves modulating incident light beams based on image signals and letting the modulated light beams exit;
   a color synthesizing/analyzing optical system including polarization beam splitters corresponding to said plurality of reflection type light valves, and color-synthesizing and analyzing the light beams having exited said plurality of reflection type light valves; and
   quarter wave plates disposed corresponding to said plurality of reflection type light valves in light paths extending from exit surfaces of said reflection type light valves to incident surfaces of said polarization beam splitters;
   wherein a first light valve group is constructed of at least a first said reflection type light valve that lets a first light beam exit, which is not reflected or is reflected an even number of times in the light path until the first light beam exits said color synthesizing/analyzing optical system after having exited said first reflection type light valve;
   a second light valve group is constructed of at least a second said reflection type light valve that lets a second light beam exit, which is reflected an odd number of times in a light path until the second light beam exits said color synthesizing/analyzing optical system after having exited said second reflection type light valve;
   in a state where said first light valve group and said second light valve group are being energized to effect image-displaying, in one of said first light valve group and said second light valve group, a phase advance axis of a corresponding quarter wave plate is disposed substantially in parallel to a predetermined axis within a surface of said reflection type light valve of said one group, which axis corresponds to a respective predetermined axis within the projection image field plane of that light valve; and
   in the other group of said first light valve group and said second light valve group in the same state, a phase advance axis of a corresponding quarter wave plate is disposed substantially perpendicularly to a predetermined axis within a surface of said reflection type light valve of said other group, which axis corresponds to a respective predetermined axis within the projection image field plane of that light valve.

2. A color synthesizing optical apparatus according to claim 1, wherein the beams of light polarization-separated and color-separated in a polarization separating/color separating optical system enter said plurality of reflection type light valves.

3. A projection type display apparatus comprising:
   a light source supplying light beams;
   a polarization separating/color separating optical system effecting polarization separation and color separation with respect to light beams emitted from said light source;
   a plurality of reflection type light valves modulating incident light beams based on image signals and letting the modulated light beams exit;
   a color synthesizing/analyzing optical system including polarization beam splitters corresponding to said plurality of reflection type light valves, and color-synthesizing and analyzing the light beams having exited said plurality of reflection type light valves;
   quarter wave plates disposed corresponding to said plurality of reflection type light valves in light paths extending from exit surfaces of said reflection type light valves to incident surfaces of said polarization beam splitters; and
   a projection optical system projecting images generated on said plurality of reflection type light valves;
   wherein a first light valve group is constructed of at least a first said reflection type light valve that lets a first light beam exit, which is not reflected or is reflected an even number of times in a light path until the first light beam exits said color synthesizing/analyzing optical system after having exited said first reflection type light valves;
   a second light valve group is constructed of at least a second said reflection type light valve that lets a second light beam exit, which is reflected an odd number of times in a light path until the second light beam exits said color synthesizing/analyzing optical system after having exited said second reflection type light valve;
   in a state where said first light valve group and said second light valve group are being energized to effect image-displaying, in one group of said first light valve group and said second light valve group, a phase advance axis of a corresponding quarter wave plate is disposed substantially in parallel to a predetermined axis within a surface of said reflection type light valve of said one group, which axis corresponds to a predetermined axis within the projection image field plane of that light valve; and
   in the other group of said first light valve group and said second light valve group in the same state, a phase advance axis of the corresponding quarter wave plate is disposed substantially perpendicularly to a predetermined axis within a surface of said reflection type light valve of said other group, which axis corresponds to a predetermined axis within the projection image field plane of that light valve.

* * * * *